US011381689B2

(12) United States Patent
Ozawa

(10) Patent No.: US 11,381,689 B2
(45) Date of Patent: Jul. 5, 2022

(54) ELECTRONIC DEVICE AND METHOD OF PRESENTING ERROR WHEN THE DEVICE IS TURNED OFF

(71) Applicant: CANON KABUSHIKI KAISHA, Tokyo (JP)

(72) Inventor: Manabu Ozawa, Nagareyama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/559,085

(22) Filed: Sep. 3, 2019

(65) Prior Publication Data

US 2020/0099795 A1 Mar. 26, 2020

(30) Foreign Application Priority Data

Sep. 26, 2018 (JP) .............................. JP2018-180942

(51) Int. Cl.
*H04N 1/00* (2006.01)
*H04N 1/12* (2006.01)

(52) U.S. Cl.
CPC ..... *H04N 1/00074* (2013.01); *H04N 1/00037* (2013.01); *H04N 1/0049* (2013.01); *H04N 1/00408* (2013.01); *H04N 1/00891* (2013.01); *H04N 1/12* (2013.01); *H04N 2201/0094* (2013.01)

(58) Field of Classification Search
CPC ........... H04N 1/00074; H04N 1/00891; H04N 1/00408; H04N 1/0049; H04N 1/00037; H04N 2201/0094; H04N 1/12; B41J 29/38; G03G 15/5004; G03G 15/5079; G03G 15/55; G06F 1/24; G06F 1/26

USPC ........................................................ 358/1.14
See application file for complete search history.

(56) References Cited

U.S. PATENT DOCUMENTS

| 4,155,436 | A | * | 5/1979 | Wilkinson | ............ | F16D 48/066 |
| | | | | | | 318/471 |
| 4,577,117 | A | * | 3/1986 | Takeda | .................. | B60Q 1/1423 |
| | | | | | | 200/61.27 |
| 9,547,288 | B2 | | 1/2017 | Utsumi et al. | | |
| 2002/0106540 | A1 | * | 8/2002 | Shioya | .............. | H01M 8/04776 |
| | | | | | | 429/410 |

(Continued)

FOREIGN PATENT DOCUMENTS

| JP | 2013-159029 | 1/2017 |
| RU | 2479087 | 4/2013 |
| RU | 2557690 | 7/2015 |

OTHER PUBLICATIONS

Russian Office Action dated Jun. 26, 2020 in Russian application No. 2019129915 (with whole English translation).

(Continued)

*Primary Examiner* — Darryl V Dottin
(74) *Attorney, Agent, or Firm* — Venable LLP

(57) ABSTRACT

An electronic device and a method of presenting an error in power off of the electronic device are provided. The electronic device includes a power switch that is manually set to ON and OFF, an actuator that sets the power switch to OFF, and a controller that outputs a control signal for controlling whether to supply power to the actuator. The electronic device notifies different information based on whether or not the power has been supplied to the actuator after the controller has output the control signal.

9 Claims, 9 Drawing Sheets

(56) References Cited

U.S. PATENT DOCUMENTS

| | | |
|---|---|---|
| 2009/0296129 A1 | 12/2009 | Hirose |
| 2010/0095144 A1 | 4/2010 | Yamanaka |
| 2010/0325462 A1* | 12/2010 | Okuzono .............. G06F 1/3203 |
| | | 713/324 |
| 2012/0159212 A1 | 6/2012 | Takatani |
| 2013/0204400 A1* | 8/2013 | Utsumi .............. G03G 15/5004 |
| | | 700/14 |
| 2014/0380077 A1* | 12/2014 | Hara .................... G06F 1/3284 |
| | | 713/323 |
| 2018/0253786 A1* | 9/2018 | Frisby .................... G07F 17/10 |

OTHER PUBLICATIONS

Russian Search Report dated Jun. 25, 2020 in Russian application No. 2019129915 (with whole English translation).

\* cited by examiner

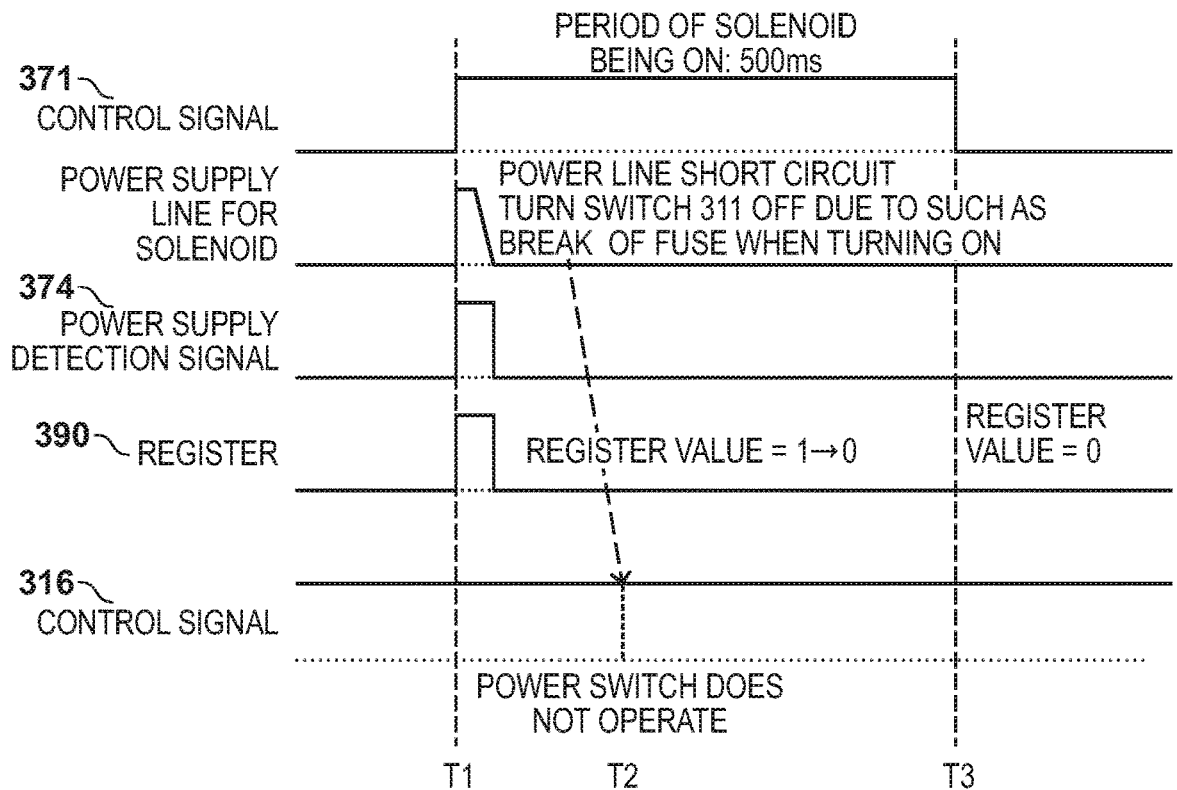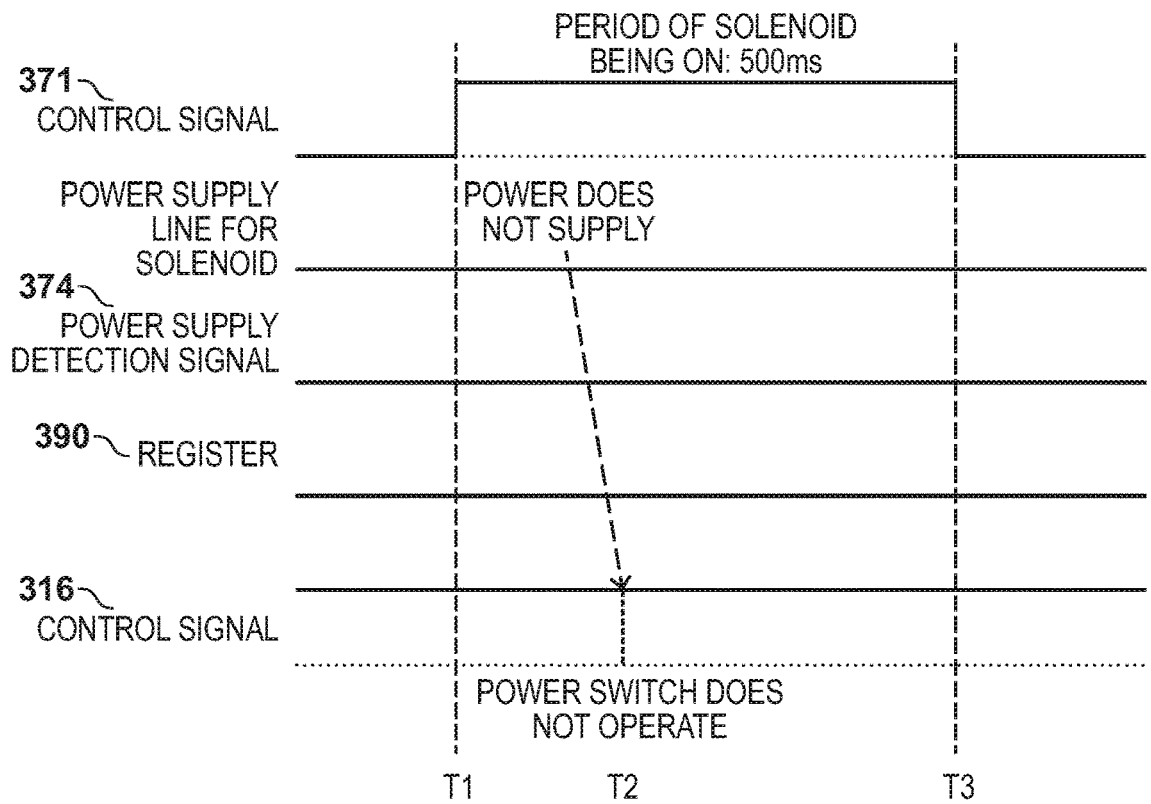

ELECTRONIC DEVICE AND METHOD OF PRESENTING ERROR WHEN THE DEVICE IS TURNED OFF

BACKGROUND OF THE INVENTION

Field of the Invention

The present invention relates to an electronic device and a method of presenting an error when the electronic device is turned off.

Description of the Related Art

Conventionally, an image forming apparatus changes to an error state if it is determined that the apparatus cannot operate normally, and an error code is displayed on a console unit. A service person will confirm this displayed error code and perform a recovery operation, such as replacing a unit related to the generated error or the like, in accordance with a service manual to make the image forming apparatus recover from the error state.

Among image forming apparatuses, there is an apparatus that is arranged with a power switch which includes an automatic power off drive circuit (mechanical relay) that automatically turns the power off when the apparatus has not been operated for a predetermined time period. Japanese Patent Laid-Open No. 2013-159029 discloses an image forming apparatus that includes such a power switch and has an automatic power off function for automatically setting the power switch to OFF by driving a relay based on signal control executed from the outside in a state in which the power switch is set to ON.

On the other hand, even if the automatic power off function is executed, there can be a case in which the power of the apparatus cannot be turned off because the driving of the mechanical relay based on the signal control fails for some kind of reason. In such a case, an error code as described above will be displayed. A service person will determine from the error code that the error is a mechanical relay driving error, and the service person will perform an operation such as replacing a required component or the like.

When power off of the apparatus by automatic power off fails in a conventional apparatus, by detecting whether or not the power switch has been set to OFF, the apparatus displays an error code indicating that the power of the apparatus cannot be turned off because the power switch could not be set to OFF. Accordingly, the service person can only confirm a result indicating that the power cannot be turned off from this error code, but cannot confirm the cause of the power failure. In other words, it is impossible for the service person to discriminate whether the cause of the power off failure is due to a breakdown of a power supply portion which supplies power for driving the mechanical relay of the power switch or due to a breakdown of the power switch itself which includes the mechanical relay.

This creates a state in which there are a plurality of units that can be an error factor for a single error code, thereby leading to generation of wastefulness by causing the service person to mistakenly choose the wrong component to be replaced out of the plurality of error code generation factor candidates. If a component other than the actual error factor component is replaced, it is impossible to recover from the error and will require another unit replacement operation to be performed repetitively. Such a repetition of the replacement operation can degrade the work efficiency of the service person.

SUMMARY OF THE INVENTION

An aspect of the present invention is to eliminate the above-mentioned problem with conventional technology.

A feature of the present invention is to provide a technique that can present, to a user, a factor of an error that has been generated at the power off of an electronic device.

According to a first aspect of the present invention, there is provided an electronic device comprising: a power switch that is manually set to ON and OFF; an actuator that sets the power switch to OFF; and a controller that outputs a control signal for controlling whether to supply power to the actuator, wherein the electronic device notifies different information based on whether or not the power has been supplied to the actuator after the controller has output the control signal.

According to a second aspect of the present invention, there is provided an electronic device comprising: a power switch that controls ON/OFF of power supply; a driver that performs driving so as to set the power switch to OFF; a power supply circuit that energizes the driver to set the power switch to OFF; a power controller that controls the power supply circuit and determines an ON/OFF state of the power switch and an energization state of the driver by the power supply circuit; a memory device that stores instructions; and a processor that executes the instruction to: notify information corresponding to the energization state of the driver in a case where the power controller determines that the power switch is not in an OFF state after the power control unit has been instructed to set the power switch to OFF.

According to a third aspect of the present invention, there is provided a method of presenting an error in power off of an electronic device including a power switch which includes a mechanical relay that controls ON/OFF of power supply and a driver that drives the mechanical relay, the method comprising: energizing the driver so as to set the power switch to OFF in accordance with a predetermined condition; storing an energization state of the driver in a memory; determining whether or not the power switch is in an OFF state after driving the driver; and executing notification corresponding to the energization state stored in the memory in a case where it is determined in the determining that the power switch is not in the OFF state.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B are timing charts for explaining an operation performed when the main power switch is to be set to OFF by remote control according to the embodiment;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that although the following embodiments will exemplify an image forming apparatus such as an MFP as an example of an electronic device according to the present invention, the present invention is not limited to such an image forming apparatus.

Figure 1:
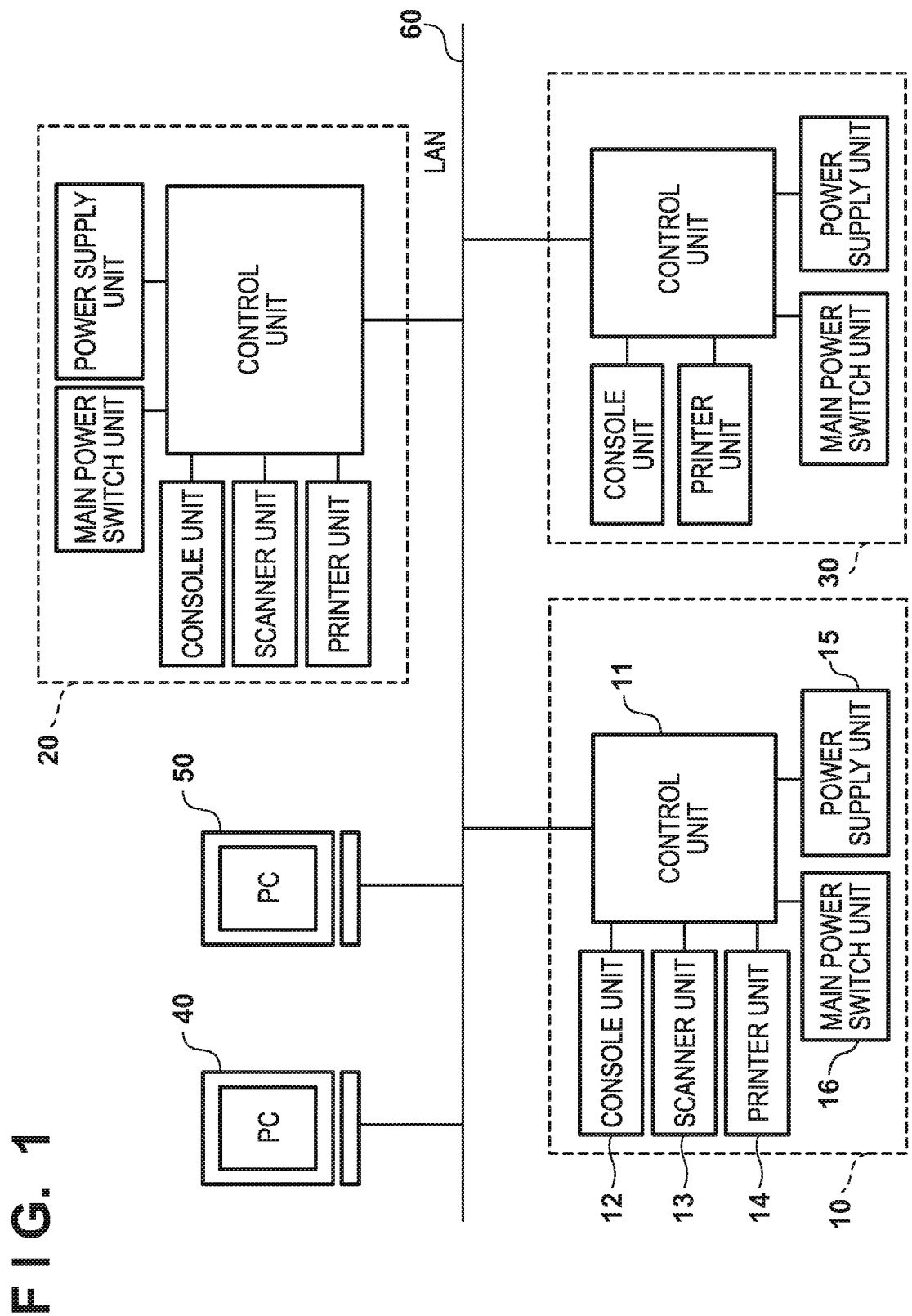
FIG. 1 is a block diagram for describing the arrangement of a print system that includes an image forming apparatus according to an embodiment of the present invention.

FIG. 1 is a block diagram for describing the arrangement of a print system that includes an image forming apparatus according to the embodiment of the present invention. Although host computers 40 and 50 and image forming apparatuses 10, 20, and 30 are connected to a LAN (local area network) 60 in this system, the present invention is not limited to this. In addition, although LAN is used as the connection method of these apparatuses in this embodiment, the present invention is not limited to this. For example, an arbitrary network such as a WAN (wide area network), a wireless LAN, or the like can also be applied.

Each of host computers (to be referred to as PCs hereinafter) 40 and 50 has a function of a personal computer. The PCs 40 and 50 can exchange files and emails by using FTP or the SMB protocol via the LAN 60 or a WAN. Each of the PCs 40 and 50 can issue a print command to the image forming apparatuses 10, 20, and 30 via a printer driver. Furthermore, the PCs 40 and 50 can periodically inquire the image forming apparatuses 10, 20, and 30 of the states of the respective image forming apparatuses. As a result, each image forming apparatus will return information indicating whether printing is possible as a response to a request from each of the PCs 40 and 50.

The image forming apparatuses 10 and 20 are apparatuses that have arrangements similar to each other and are, for example, multi-function peripherals (MFPs). The image forming apparatus 30 is an image forming apparatus that has only a print function. Other than the fact that it does not include a scanner unit, it has an arrangement similar to those of the image forming apparatuses 10 and 20. For the sake of descriptive convenience, attention will be focused on the image forming apparatus 10 among these image forming apparatuses, and the arrangement of the image forming apparatus 10 will be described in detail below.

The image forming apparatus 10 includes a scanner unit 13 as an image input device, a printer unit 14 as an image output device, a control unit 11 that controls the overall operation of the image forming apparatus 10, and a console unit 12 that serves as a user interface (UI). It also includes a power supply unit 15 that performs AC/DC conversion and supplies power to each block in the image forming apparatus 10 and a main power switch unit 16 that includes a switch for switching the power of the image forming apparatus 10 between the ON state and the OFF state.

Figure 2:
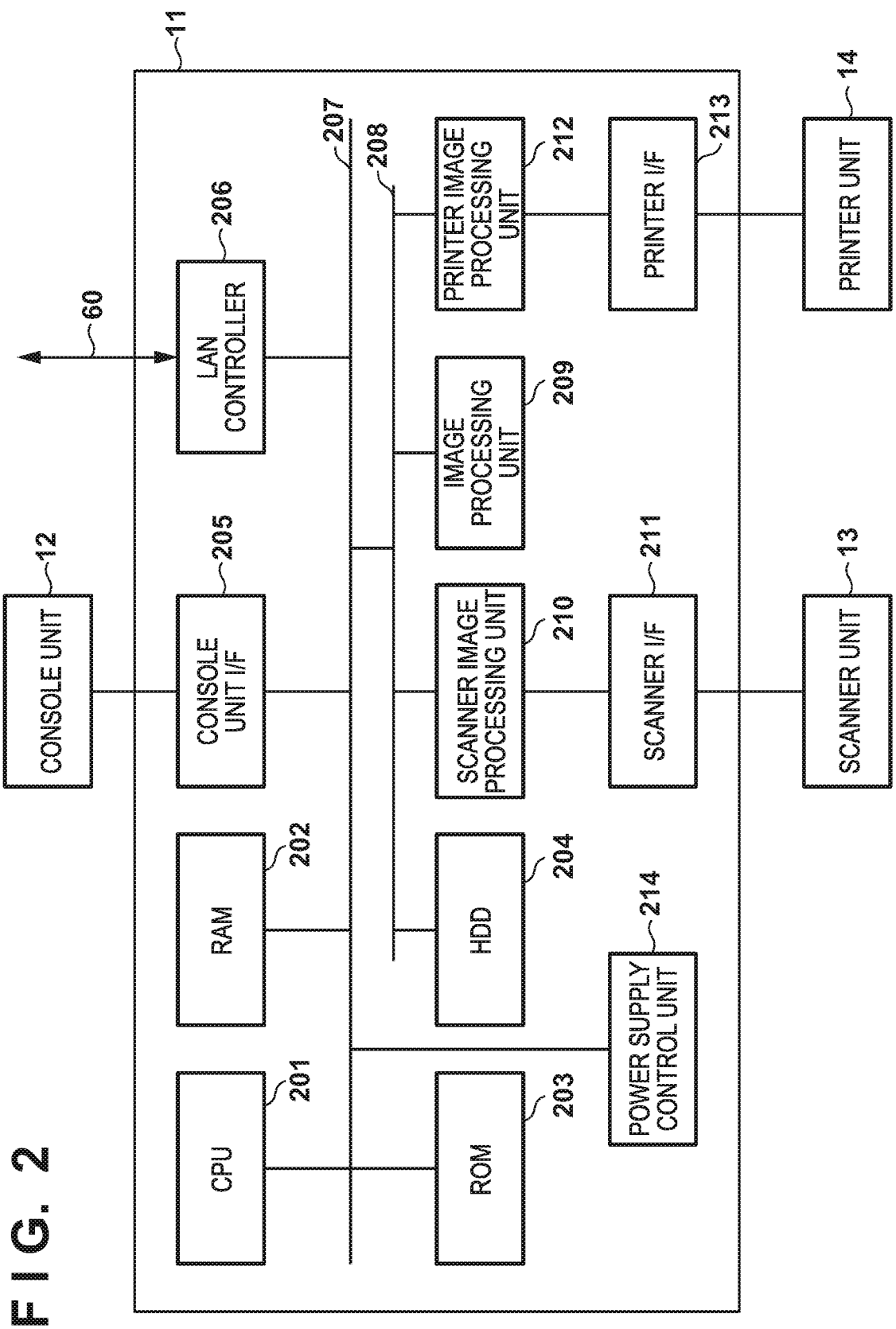
FIG. 2 is a block diagram for explaining the arrangement of a control unit of the image forming apparatus according to the embodiment.

FIG. 2 is a block diagram for explaining the arrangement of the control unit 11 of the image forming apparatus 10 according to the embodiment. Note that in FIG. 2, the same reference numerals denote parts in common with those of FIG. 1.

The control unit 11 is electrically connected to the scanner unit 13 and the printer unit 14 and is also, on the other hand, connected to external apparatuses such as the PCs 40 and 50 via the LAN 60 or the like. This allows input and output of image data and device information to be performed.

A CPU 201 integrally controls the access each device by executing a boot program stored in a ROM 203, deploying a program stored in an HDD 204 into a RAM 202, and executing the deployed program. Furthermore, the CPU 201 integrally controls various kinds of processes executed under the control of the control unit 11. The RAM 202 provides a system work memory for the operation of the CPU 201 and serves as a memory for temporarily storing image data. This RAM 202 is formed by an SRAM that can hold a stored content even after the power off of the apparatus and a DRAM in which a stored content is deleted by the power off of the apparatus. The boot program and the like of the apparatus are stored in the ROM 203. The HDD 204 is a hard disk drive and can store system software and image data.

A console unit I/F 205 is an interface unit to connect a system bus 207 and the console unit 12. This console unit I/F 205 outputs the image data to be displayed on the console unit 12 that has been received from the system bus 207 to the console unit 12, and outputs information input from the console unit 12 to the system bus 207. A LAN controller 206 connects to the LAN 60 and the system bus 207 and performs information input/output control. The LAN controller 206 also includes a power receiving unit of Power Over Ethernet (POE) and can receive power supplied from a LAN cable. Hence, the LAN controller 206 can operate not only based on power supplied from the power supply of the image forming apparatus 10, but also based on power supplied by POE.

An image bus 208 is a bus for exchanging image data and is formed by a bus such as a PCI bus, IEEE1394, and the like. An image processing unit 209 is a unit for executing image processing, and reads out the image data stored in the RAM 202 to execute image processing operations, for example, image enlargement and reduction of JPEG, JBIG, or the like, color adjustment, and the like. A scanner image processing unit 210 corrects, processes, and edits the image data received from the scanner unit 13 via a scanner I/F 211. Note that the scanner image processing unit 210 can determine whether the received image data is a color image or a monochrome image as well as further determine whether the received image data is an image of a text document or an image of a photographic document. The scanner image processing unit 210 can subsequently associate the determination result with the image data and output information indicating the determination result together with the image data. This ancillary information will be referred to as attribute data. The printer image processing unit 212 refers to attribute data associated with the image data and performs image processing on the image data. After the image processing, the image data is output to the printer unit 14 via a printer I/F 213 and printed.

A power supply control unit 214 executes power control at the time of activation and at the time of power off of the image forming apparatus 10, and controls changes in the power state such as the shift to/return from a power saving state. Upon detecting various kinds of return factors (for example, the reception of FAX, the pressing of a switch, and the like) that can cause the apparatus to return from the power saving state or receiving a command from the CPU 201 or a signal indicating a return from the power saving state such as a wake signal 302 (FIG. 3) which is to be described later, the power supply control unit 214 performs power control corresponding to each return factor. The details of this power control will be described later with reference to FIG. 3. Furthermore, the power supply control unit 214 also performs energization control on a solenoid 404 (FIG. 4), which is to be described later with reference to FIG. 4, to turn off a main power switch 380 (FIG. 3) including a mechanical relay and is incorporated in the main power switch unit 16. Shutdown by remote control is an operation in which the image forming apparatus 10 receives an instruction to shut down the image forming apparatus 10 from an external apparatus such as the PC 40 or the like via the LAN 60 and performs shutdown processing in accordance with the shutdown instruction.

Figure 3:
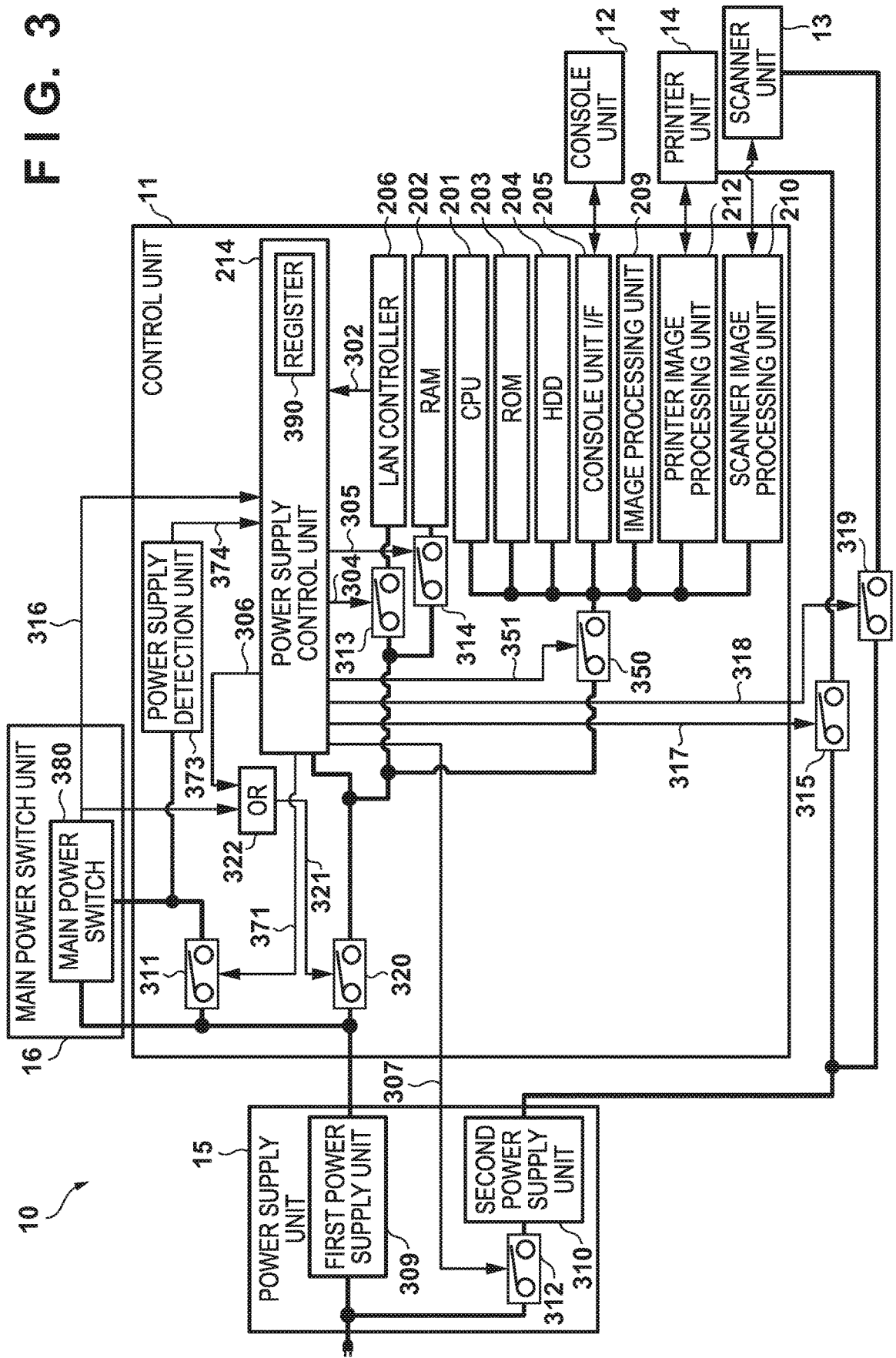
FIG. 3 is a block diagram for describing the hardware arrangement related to power control of the control unit, a scanner unit, and a printer unit of the image forming apparatus according to the embodiment.

FIG. 3 is a block diagram for describing the hardware arrangement related to power control of the control unit 11, the scanner unit 13, and the printer unit 14 of the image forming apparatus 10 according to the embodiment.

The power supply control unit 214 executes power control at the time of activation and at the time of power off of the image forming apparatus and controls changes in the power state such as the shift to/return from the power saving state. The wake signal 302 is a signal which is transmitted from the LAN controller 206 to notify the power supply control unit 214 that the LAN controller 206 has received a packet transmitted to the image forming apparatus 10 via the LAN 60 while the image forming apparatus 10 is in the sleep (power saving) state. Upon receiving the wake signal 302, the power supply control unit 214 controls control signals 307, 317, 318, and 351 to selectively supply the power to each device.

A control signal 304, a control signal 305, the control signal 307, the control signal 317, the control signal 318, a control signal 321, the control signal 351, and a control signal 371 are signals supplied to corresponding switches 311, 312, 313, 314, 315, 319, 320 and 350 for controlling whether or not to supply power to each device. The switches 311 to 315, 319, 320, and 350 are switches that are switched between ON/OFF by the control signals 371,307, 304, 305, 307, 317, 318, 321, and 351. That is, the power supply state of each device can be changed by controlling the switches 311 to 315, 319, 320, and 350 by the control signals 304, 305, 307, 317, 318, 321, 351, and 371. Each of these switches 311 to 315, 319, 320, and 350 can be implemented by, for example, an FET, a relay switch, or the like.

The control signal 304 and the switch 313 control the power supply to the LAN controller 206. In a case in which the image forming apparatus 10 is in the standby state or the power saving state, power is supplied to the LAN controller 206. In a case in which the image forming apparatus 10 is in the OFF state, control is performed to stop the power supply to the LAN controller 206.

The control signal 305 and the switch 314 control the supplying of first power from a first power supply unit 309 (to be described later) to the RAM 202. For example, in a case in which the image forming apparatus is in the power saving state, power supply may be performed from the first power supply unit 309 to the RAM 202 which is in a self-refreshing state, and in a case in which the image forming apparatus 10 is to be set to the OFF state, the power supply from the first power supply unit 309 to the RAM 202 may be stopped.

A control signal 306 is a signal controlled by the power supply control unit 214 and indicates that the image forming apparatus 10 can be shutdown normally. In the embodiment, a state in which the control signal 306 is "1" (high level) indicates that the image forming apparatus 10 is in a state in which the shutdown preparation has not been completed, and a state in which the control signal 306 is "0" (low level) indicates that the image forming apparatus 10 has completed the shutdown preparation. The control signal 306 is input to an OR circuit 322 (to be described later) and an output of the OR circuit 322 controls the switching of the switch 320 by becoming the control signal 321 that controls the power supply from the first power supply unit 309 to the control unit 11 together with a control signal 316 (to be also described later).

The control signal 307 and the switch 312 control the AC power supply to a second power supply unit 310. The second power supply unit 310 is a power supply which is set to OFF in the power saving state and is set to ON in the standby state. For example, if the power supply control unit 214 receives the wake signal 302 in the power saving state, the power supply control unit 214 sets the switch 312 to ON by controlling the control signal 307. As a result, the power of each device required during the standby state can be set to ON.

The first power supply unit 309 converts AC power (commercial power) into DC power and supplies the first power to each component block of the control unit 11 via the switch 320. The first power supplied from the first power supply unit 309 is power provided to supply power to the power supply control unit 214 or the like even when the image forming apparatus 10 is set to the power saving state. Other than the power supply control unit 214, the first power is also supplied to the LAN controller 206 for detecting a packet addressed to the image forming apparatus 10 from the LAN 60 to return from the power saving state.

The second power supply unit 310 converts AC power into DC power and supplies second power to each device. The second power supplied from the second power supply unit 310 is power that is not supplied when the image forming apparatus 10 is in the power saving state. The second power supply unit 310 supplies power to the printer unit 14 and the scanner unit 13 that do not need power supply during the power saving state. These first power supply unit 309 and second power supply unit 310 are included in the power supply unit 15 shown in FIG. 1.

The control signal 321 and the switch 320 control power supply from the first power supply unit 309 to the components included in the control unit 11. The control signal 321 is a control signal output from the OR circuit 322 which receives the control signals 306 and 316.

The main power switch 380 is a switch for a user to make a power on/off operation of the image forming apparatus 10, and power is supplied to the control unit 11 from the first power supply unit 309 when the user sets the main power switch 380 to ON. A solenoid as a driver that drives the mechanical relay is installed in the main power switch 380, and it is arranged so that the main power switch 380 will be switched to OFF when the solenoid 404 (FIG. 4B) is energized. The main power switch 380 will be described in detail later with reference to FIGS. 4A and 4B.

When the user sets the main power switch 380 to ON, the control signal 316 which indicates whether the main power switch 380 is ON or OFF changes to "1" (high level) indicating that the main power switch 380 is ON. As a result, the control signal 321 output from the OR circuit 322 is set to "1" (high level) and the switch 320 is set to ON. Power supply to each component of the control unit 11 from the first power supply unit 309 is started in this manner. In addition, when the user sets the main power switch 380 to OFF, the control signal 316 changes to "0" (low level) indicating that the main power switch 380 is OFF. At this time, the control signal 321 output from the OR circuit 322 will be at high level since the control signal 306 from the power supply control unit 214 will remain at "1" (high level). Hence, the ON state of the switch 320 is maintained, and the power supply to the control unit 11 is maintained until the image forming apparatus 10 can shutdown normally. When the control signal 316 output from the main power switch 380 changes to "0" (low level), the power supply control unit 214 determines that the main power switch 380 has been set to OFF and notifies the CPU 201 of this fact. The CPU 201 stores this notification and obtains this information in the process of step S804 in FIG. 8 (to be described later). By changing the control signal 306 to "0" (low level) after normally executing the shutdown processing, it is possible to stop the power supply to each device.

Energizing of the solenoid 404 is performed by controlling the switch 311 by the control signal 371. In this embodiment, the switch 311 can be set to ON by changing the control signal 371 to "1" (high level), and the switch 311 can be set to OFF by changing the control signal 371 to "0" (low level). This allows the main power switch 380 to be set to OFF by using the control signal 371 to set the switch 311 to ON to energize the solenoid 404 when a shutdown instruction is received by remote control.

A power supply detection unit 373 is a detection unit for discriminating whether or not energization has been performed correctly when the solenoid 404 is to be energized, and the power supply detection unit 373 notifies the power supply control unit 214 of the detection result by a power supply detection signal 374. In this embodiment, a case in which the power supply detection signal 374 is "1" (high level) indicates an energized state, and a case in which the power supply detection signal 374 is "0" (low level) indicates a non-energized state.

In a case in which the main power switch 380 cannot be set to OFF, the power supply control unit 214 determines whether or not the solenoid 404 has been energized by monitoring the power supply detection signal 374. More specifically, the power supply control unit 214 monitors the power supply detection signal 374 by changing the control signal 371 to high level and setting the switch 311 to the ON state. If the control signal 316 does not change to low level, that is, if the main power switch 380 is not set to OFF, the power supply control unit determines whether or not the solenoid 404 has been energized based on the power supply detection signal 374. This determination result is stored in a register 390 of the power supply control unit 214 which is accessible from the CPU 201 and is used by the CPU 201 to isolate and determine the cause of the power off failure. That is, the power supply control unit 214 will determine that the power did not flow to the solenoid 404 when the power supply detection signal 374 is not at high level. On the other hand, since the main power switch 380 will not be set to OFF even if the solenoid 404 is energized when the power supply detection signal 374 is at high level, the power supply control unit 214 will determine that the main power switch 380 has broken down. The details of this determination will be described later with reference to FIG. 8.

Figure 4A:
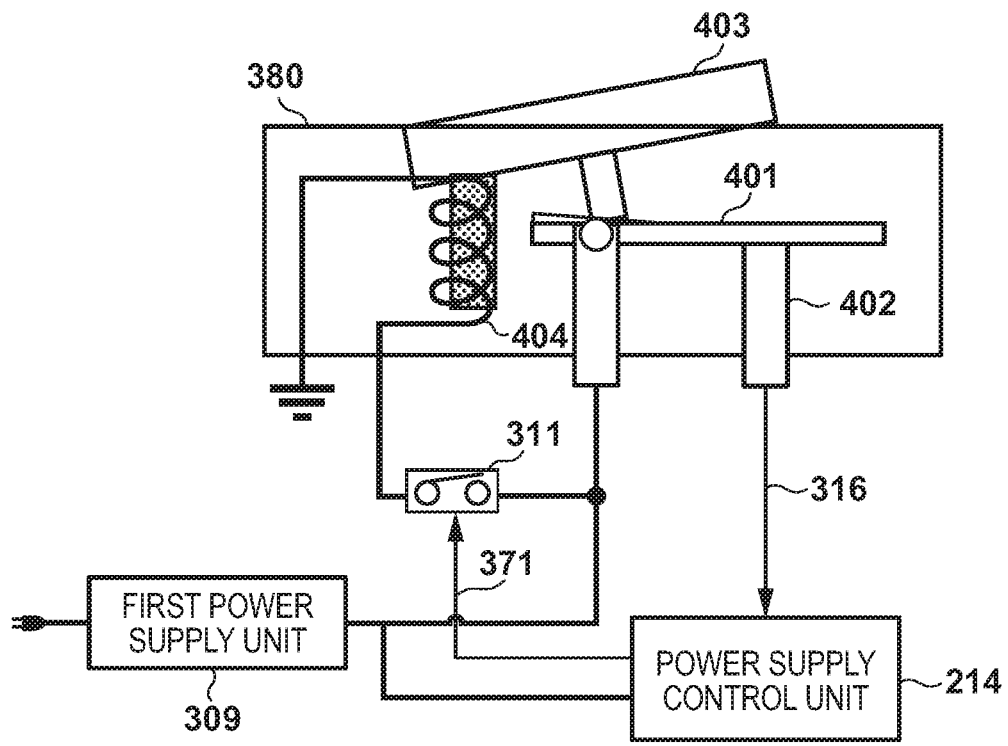
FIGS. 4A and 4B depict views for explaining the arrangement of a main power switch which includes a mechanical relay according to the embodiment.
Figure 4B:
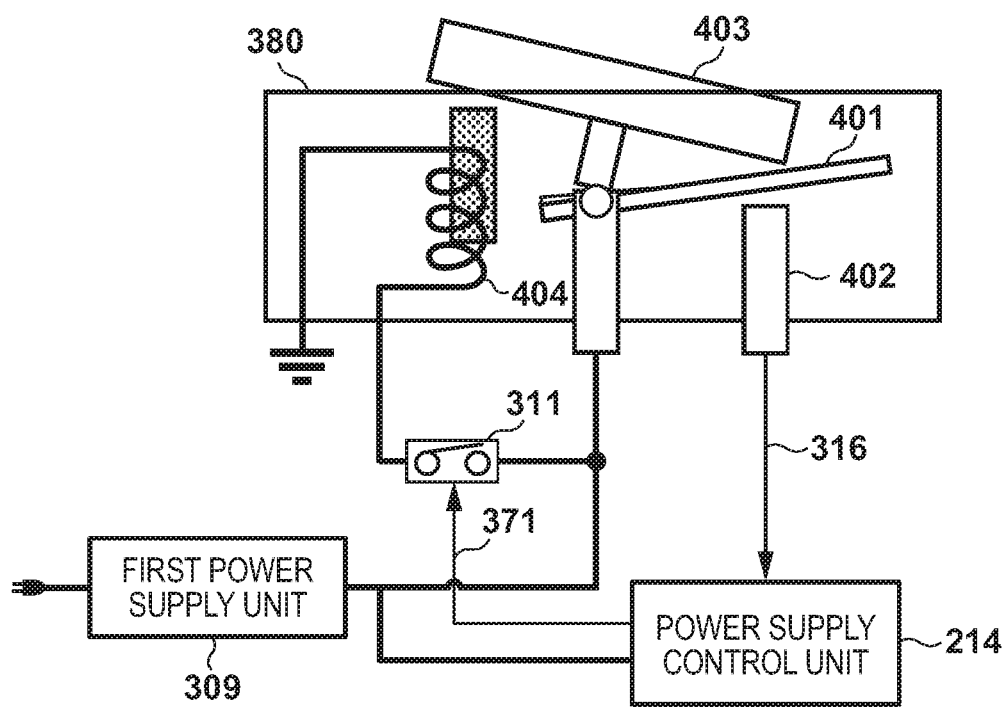

FIGS. 4A and 4B depict views for explaining the arrangement of the main power switch 380 including the mechanical relay according to the embodiment. Each drawing is a drawing obtained by combining a sectional view of the main power switch 380 and the peripheral circuit related to switch-off control using the solenoid 404. FIG. 4A depicts a view showing the ON state of the main power switch 380, and FIG. 4B depicts a view showing the OFF state of the main power switch 380.

The main power switch 380 including the mechanical relay includes a movable contact 401, a fixed contact 402, a movable operation unit 403, and a solenoid 404. In a case in which the main power switch 380 is to be set to ON, the main power switch 380 will be set to ON when the user presses the movable operation unit (button) 403 to bring the movable contact 401 into contact with the fixed contact 402 (FIG. 4A).

On the other hand, in a case in which the main power switch 380 is to be set to OFF, the main power switch 380 will be set to OFF when the user operates the button 403 to cause the movable contact 401 to separate from the fixed contact 402 (FIG. 4B). There are two methods for operating the button 403 in the OFF direction. One method is a method in which the user directly operates the button 403. The other method is a method of driving the solenoid 404 by energizing the solenoid 404 through a solenoid power supply line by setting the switch 311 to ON by the control signal 371. The main power switch 380 is set to OFF by driving the solenoid 404 to move the button 403 in an upward direction to separate the movable contact 401 from the fixed contact 402.

In the ON state of the main power switch 380 shown in FIG. 4A, a current flows to the control signal 316 because the movable contact 401 is in contact with the fixed contact 402. As a result, the power supply control unit 214 can identify that the main power switch 380 is in the ON state as described above. In the OFF state of the main power switch 380 shown in FIG. 4B, the current does not flow to the control signal 316 because the movable contact 401 is not in contact with the fixed contact 402. Hence, the power supply control unit 214 can identify that the main power switch 380 is in the OFF state.

The breakdown of the main power switch 380 occurs when the state of the main power switch 380 does not change even when the solenoid 404 is energized due to the solenoid 404 not operating even after energization, the button 403 or the movable contact 401 not moving due to factors such as rust, or the like.

Note that the control signal 316 is output when the main power switch 380 is set to ON by directly inputting the power supplied from the first power supply unit 309 to the main power switch 380 in this embodiment. However, it is preferable to convert the signal to a suitable signal level by performing DC-DC conversion before supplying power to the solenoid 404 in accordance with the input specification of a component to be connected. For example, a DC-DC conversion circuit may be inserted immediately before power supplying to the solenoid is input to the main power switch 380.

Figure 5A:
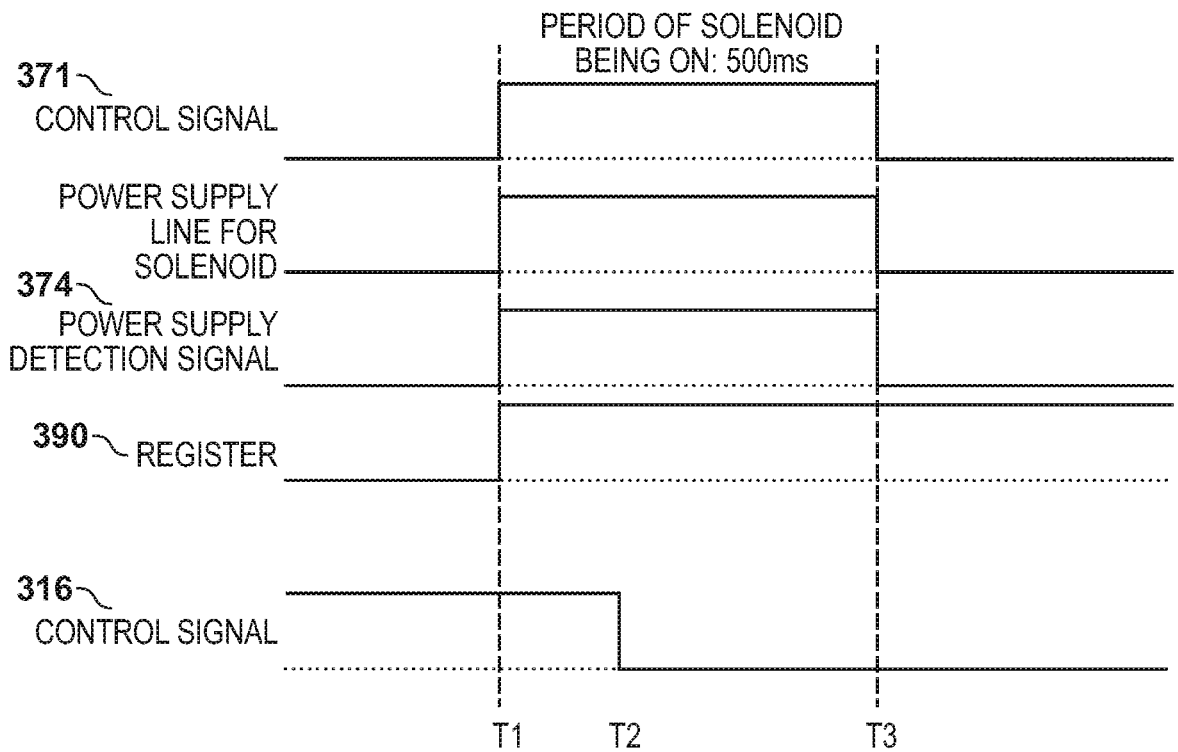
FIGS. 5A and 5B are timing charts for explaining an operation performed when the main power switch is to be set to OFF by remote control according to the embodiment.
Figure 5B:
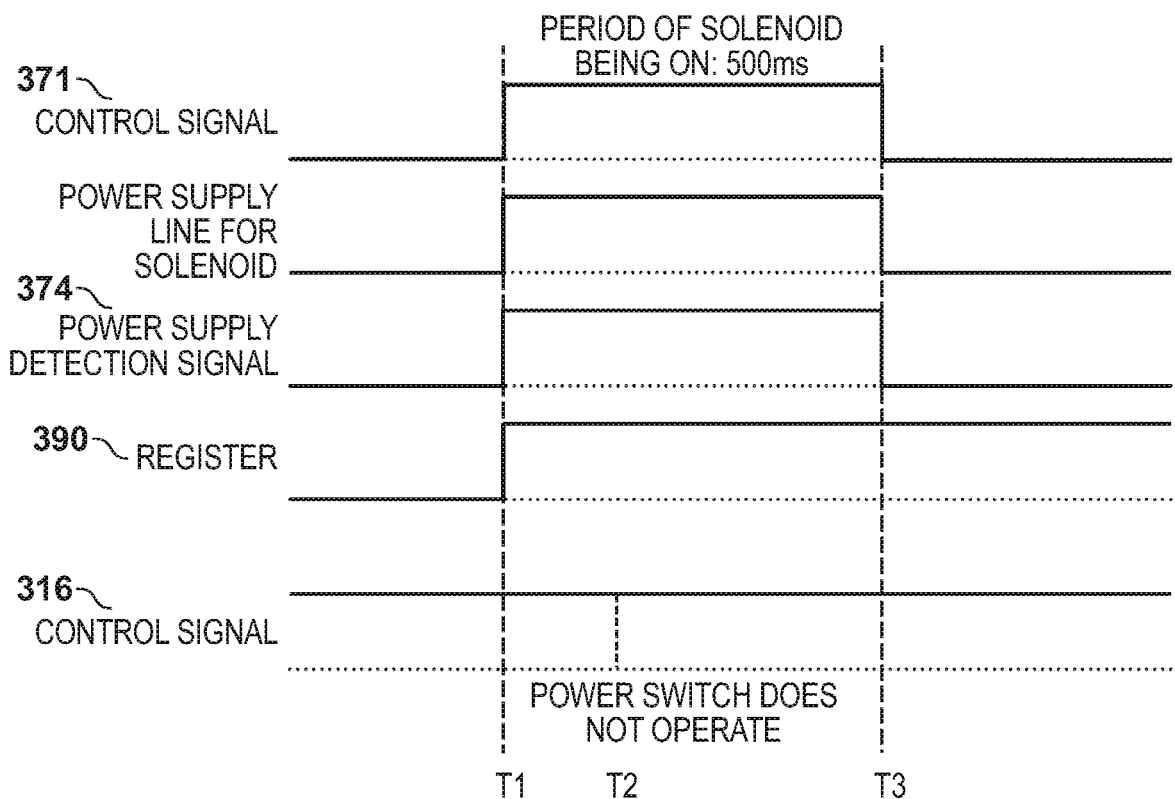

FIGS. 5A and 5B and FIGS. 6A and 6B are timing charts for explaining the operation performed when the main power switch 380 is set to OFF by remote control according to this embodiment. FIG. 5A shows a case in which the main power switch 380 has been set to OFF normally, and FIGS. 5B, 6A, and 6B show cases in which the main power switch 380 could not be set to OFF normally.

FIG. 5A is a timing chart of a case in which the main power switch 380 is correctly set to OFF when the power supply control unit 214 is operated under shutdown control by remote control.

First, at timing T1 of FIG. 5A, the power supply control unit 214 sets the control signal 371 for controlling the ON/OFF of the switch 311 to "1" (high level). The switch 311 is set to "1" when the control signal 371 changes to "1", and energization via a solenoid power supply line to the solenoid 404 is started. Also, upon detecting the energization of the solenoid 404, the power supply detection unit 373 sets the energization state of the power supply detection signal 374 to high level. As a result, the power supply control unit 214 can reflect the result of the power supply detection signal 374 to the value of the register 390. Note that this embodiment will determine that the solenoid 404 has been energized if the value of the register 390 is "1", and that the solenoid has not been energized if the value is "0". Depending on the circuit arrangement, it may be arranged so that the power supply control unit 214 will determine that the solenoid 404 has been energized when the value is "0" and the solenoid 404 has not been energized when the "1", as a matter of course.

Timing T2 of FIG. 5A is a timing at which the main power switch 380 is set to OFF by the operation of the solenoid 404 and the control signal 316 changes to "0" (low level) indicating that the main power switch 380 has been set to OFF as a result. Timing T3 of FIG. 5A is a timing at which energizing of the solenoid 404 is stopped by changing the control signal 371 to "0". In general, while a predetermine period of time is required for the solenoid 404 to completely change its state, prolonging the energization time of the solenoid 404 will cause the driving capability of the solenoid 404 to degrade. Hence, control must be executed so that energization will be performed for a period of time which is sufficient enough to drive the solenoid 404 and in a period of time which is shorter than the energization time specified for the component. Assume that this time is 500 msec in the description of this embodiment.

Subsequently, after timing T3, the value of the register 390 is held at "1". This is because when the control signal 316 has not been set to "0" even at timing T3, it will be determined that an error state has occurred due the fact that the main power switch 380 is not set to OFF, and the register 390 will be referred in this embodiment. By setting such an arrangement, the CPU 201 can execute error determination at an arbitrary timing after timing T3. If the value of the register 390 is held, the holding timing may be set at any timing as long as it falls within a period from the timing at which the main power switch 380 is set to OFF and the control signal 316 is changed to "0" until timing T3 at which energizing of the solenoid 404 is stopped. However, in terms of detecting the breakdown of the switch 311 which controls the energization of the solenoid 404, it is preferable to set the holding timing at immediately before the timing T3 at which the energization of the solenoid 404 is stopped by changing the control signal 371 from "1" to "0". The reason for this will be described in detail with reference to FIG. 6B. It is also may be arranged so that a desired error determination will be made when the power supply detection signal 374 does not change to "0" and the control signal 316 does not change to "0" after the CPU 201 has polled the value of the control signal 316 and the value of the register 390 during a period in which the control signal 371 is set to "1".

FIG. 5B shows a case in which the main power switch 380 did not operate at timing T2, the control signal 316 did not change to "0", and the value of the register 390 indicates "1" after timing T3. In this case, due to the fact that "1" indicating the energized state of the solenoid 404 is stored as the value in the register 390 after timing T3 and the fact that the control signal 316 is in the state of "1" indicating that the main power switch 380 is not set to OFF, it can be determined that the main power switch 380 has broken down.

FIG. 6A shows a case in which the main power switch 380 did not operate at timing T2, the control signal 316 did not change to "0", and the value of the register 390 indicates "0" after timing T3. In this case, due to the fact that "0" indicating the non-energized state of the solenoid 404 is stored as the value in the register 390 after timing T3 and the fact that the control signal 316 is in the state of "1" indicating that the main power switch 380 is not set to OFF, it can be determined that the switch 311 has broken down.

FIG. 6B shows a case in which the energization of the solenoid 404 is started correctly at timing T1, but the main power switch 380 could not operate at timing T2 because the switch 311 was set to OFF before timing T2 at which the main power switch 380 was to operate. Phenomena such as breaking of a fuse (not shown), a simple breakdown of the switch 311, and the like are examples of causes that can set the switch 311 to OFF before timing T2.

Since it takes time for the energization operation to be completed after the energizing of the solenoid 404 has been started, a certain amount of time is necessary from timing T1 until the main power switch 380 has been switched to the OFF state. Hence, it can be sufficiently expected that a breakdown of a power supply component will occur before the switch 311 has been switched to the OFF state. Note that although the value of the register 390 will change to "1" at timing T1 because the power supply operation has been started once, the value will change back to "0" again at the timing when the switch 311 is set to OFF. It is possible to consider, as a similar case, a case in which the main power switch 380 is set to OFF at timing T2 and the switch 311 breaks down during a time period from when the control signal 316 has changed to "0" until the energizing of the solenoid 404 is stopped at timing T3. Thus, when the value of the register 390 is to be held by taking such cases into account, the suitable timing is timing T3. As a result, it becomes possible to also detect a state in which the switch 311 has broken down during the sequence even though the main power switch 380 normally operate.

The control procedure related to the power supply control unit 214 during shutdown control by remote control will be described in detail next with reference to FIG. 7. Note that this procedure is always executed after the power supply control unit 214 is set to ON and that this procedure is processed in parallel with other power supply control procedures executed by the power supply control unit 214 but not described in this embodiment.

Figure 7:
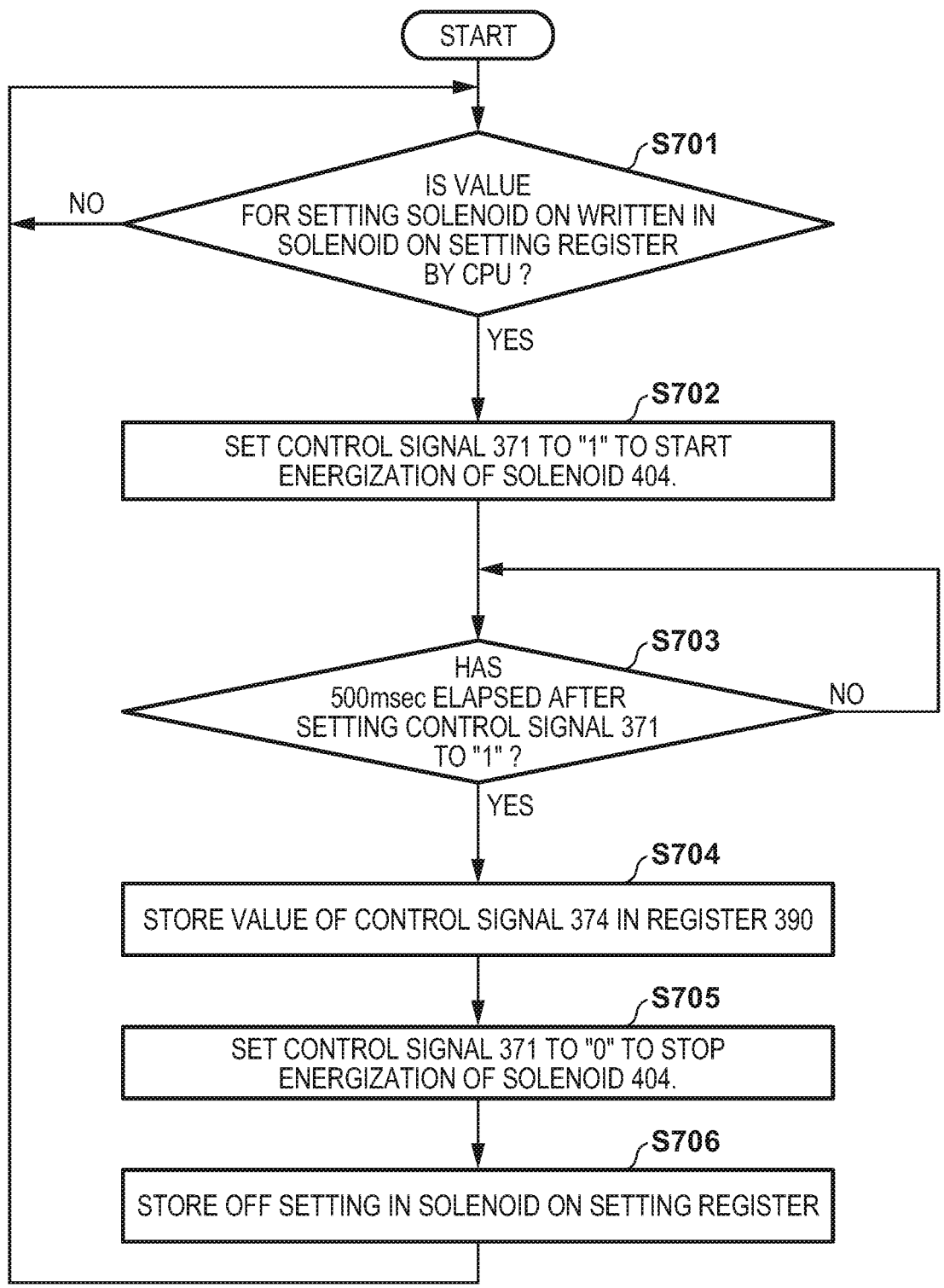
FIG. 7 is a flowchart for describing processing of a power supply control unit according to the embodiment.

FIG. 7 is a flowchart for describing the processing of the power supply control unit 214 according to the embodiment.

In step S701, the power supply control unit 214 waits for a reception of a command to set the solenoid 404 to ON from the CPU 201. This command for setting the solenoid 404 to ON is executed by the CPU 201 writing a value to set the value of the control signal 371 to "1" in a register (not shown in the drawings and to be referred to as a solenoid ON setting register hereinafter) for controlling the control signal 371 included in the power supply control unit 214. Here, in this description, assume that the value of the control signal 371 will change to "1" when "1" is written in the solenoid ON setting register. If the register value for changing the value of control signal 371 to "1" has been written, the process advances to step S702. Otherwise, the process of step S701 is repeated. In step S702, the power supply control unit 214 sets the control signal 371 to "1". The switch 311 is set to the ON state when the control signal 371 is set to "1" in this manner, and the energization of the solenoid 404 is started. Next, the process advances to step S703, and the power supply control unit 214 stands by for a predetermined time until the main power switch 380 changes to the OFF state when the solenoid 404 is operated by setting the control signal 371 to "0". In this case, the standby time is 500 msec, and the process advances to step S704 after 500 msec has elapsed. Otherwise, the process of step S703 is repeated, and the power supply control unit 214 stands by for the standby time to elapse. In step S704, the power supply control unit 214 writes the value of the power supply detection signal 374 in the register 390. The malfunction of the main power switch 380 can be correctly determined even in a case of FIG. 6B as described above by storing the value of the power supply detection signal 374 in the register 390 at this timing.

Next, the process advances to step S705, and the power supply control unit 214 stops the energizing of the solenoid 404 by setting the control signal 371 to "0". Next, the process advances to step S706, and the power supply control unit 214 rewrites the value of the solenoid ON setting register, which had been written by the CPU 201 to change the control signal 371 to "1" in step S701, to "0" indicating that the control signal 371 is "0". The process returns again to step S701, and the power supply control unit 214 stands by again to receive a command to set the solenoid 404 to ON from the CPU 201. By such an arrangement, it is possible to execute retry control when the power off to be described in FIG. 8 is not performed.

Figure 8:
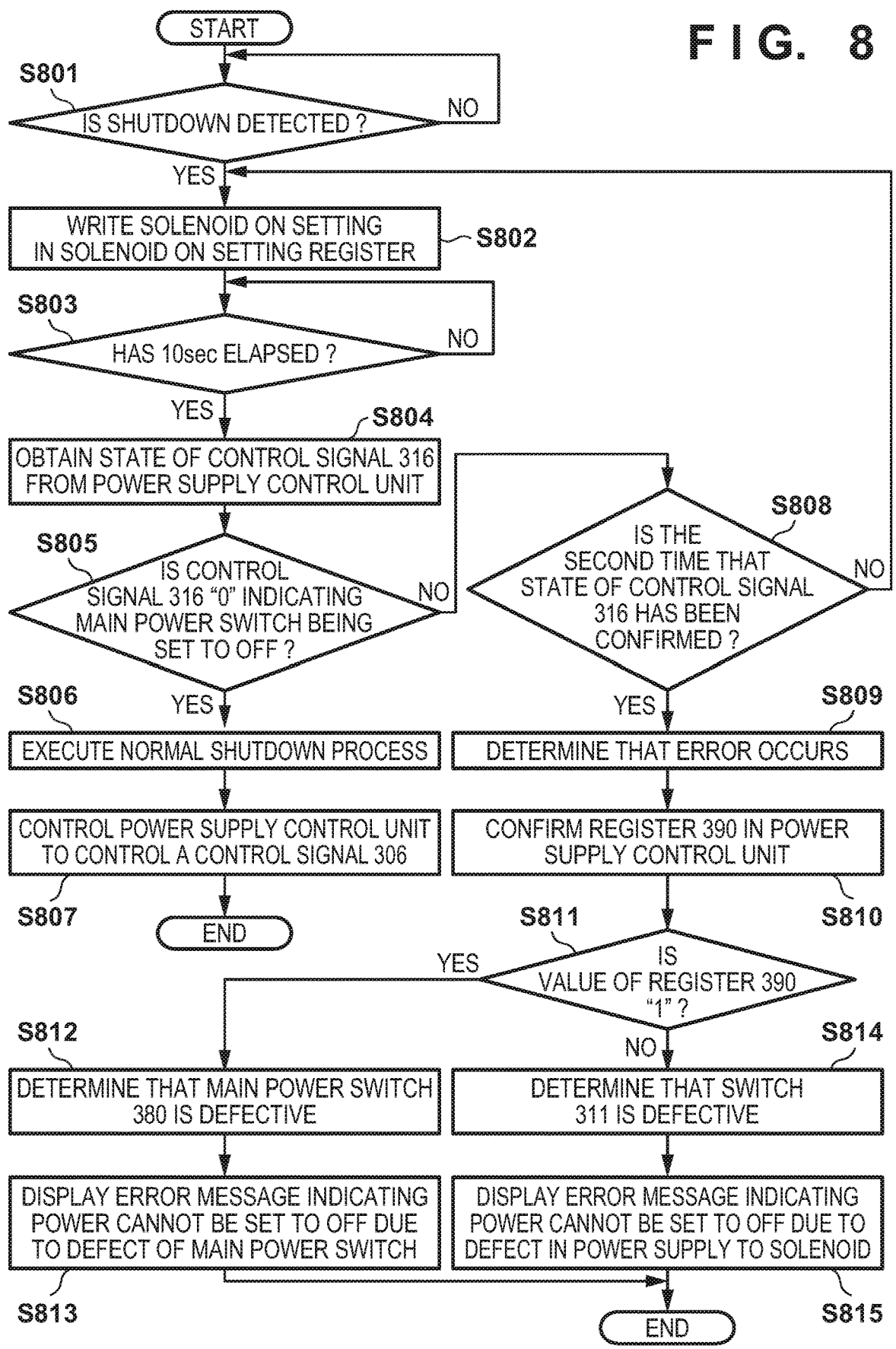
FIG. 8 is a flowchart for describing shutdown processing executed by remote control in the image forming apparatus according to the embodiment.

FIG. 8 is a flowchart for describing shutdown processing by remote control of the image forming apparatus 10 according to the embodiment. Note that the processing shown in this flowchart is implemented by the CPU 201 executing a program deployed in the RAM 202.

First, in step S801, the CPU 201 determines whether or not a predetermined condition for automatically setting the main power switch 380 to OFF has been satisfied. That is, the CPU 201 determines whether or not the main power switch 380 should be set to OFF by energizing the solenoid 404 and moving the button 403. For example, the CPU 201 will determine whether or not it has received a shutdown instruction from an external apparatus (the remote control issuing source) via the LAN 60. If the shutdown instruction is received by the CPU, the process advances to step S802. Otherwise, the process of step S801 is repeated. In step S802, the CPU 201 writes a solenoid ON setting in the solenoid ON setting register of the power supply control unit 214. As a result, the CPU 201 can cause the power supply control unit 214 to perform the processes of step S702 and subsequent steps of FIG. 7 described above. That is, the control signal 371 can be set to and output as "1" from the power supply control unit 214. In this manner, the switch 311 changes to the ON state when the control signal 371 is set to "1", and energization of the solenoid 404 is started.

Next, the process advances to step S803, and the CPU 201 stands by for a predetermine time required for the power supply control unit 214 to set the main power switch 380 to OFF. Although this standby time is assumed to be 10 sec in this embodiment, the value of this standby time can be set appropriately based on the ON period of the control signal 371, as a matter of course. During the period of this standby time, the power supply control unit 214 will execute the processing described in the flowchart of FIG. 7 and ends the energizing of the solenoid 404 by ultimately changing the switch 311 to the OFF state by setting the control signal 371 to "0".

Next, the process advances to step S804, and the CPU 201 obtains, from the power supply control unit 214, the state of the control signal 316 which represents the state of the main power switch 380. As described above, this is implemented by causing the power supply control unit 214 to determine that the main power switch 380 has been set to OFF when the control signal 316 output from the main power switch 380 has changed to "0" (low level), and notifying the CPU 201 of this fact. If the value of the state of the control signal 316 is "1", it indicates that the main power switch 380 has not been set to OFF, and if the value is "0", it indicates that the main power switch has been set to OFF. Next, the process advances to step S805, and the CPU 201 determines whether or not the main power switch 380 has been set to OFF based on the result obtained in step S804. If the control signal 316 is "0", it will be determined that the main power switch 380 has been set to OFF normally, and the process advances to step S806 to execute normal shutdown processing. On the other hand, if the control signal 316 is "1", it will be determined that a power off error has occurred, and the process advances to step S808.

When the CPU 201 is to execute the normal shutdown processing in step S806, the CPU 201 will transmit a power off instruction to the power supply control unit 214. As a result, it is ultimately possible to set the power of each device of the image forming apparatus 10 to OFF. Upon receiving the shutdown instruction from the CPU 201, the power supply control unit 214 sets the power supply to each device to OFF by controlling the control signals 304, 305, 307, 317, 318, 321, 351, and 371 to set the switches 311 to 315, 319, 320, and 350 to OFF. Subsequently, the process advances to step S807, and the CPU 201 controls the power supply control unit 214 to set the control signal 306 to "0". The switch 320 can be set to OFF by setting the control signal 321 to "0" by setting the control signal 306 to "0" via the control signal 316 and the OR circuit 322 already set to "0". As a result, the first power supply from the first power supply unit 309 to the control unit 11 can be stopped and the shutdown processing can be completed.

On the other hand, when the main power switch 380 is not set to OFF normally, the CPU 201 determines, in step S808, whether or not this is the second time that the state of the control signal 316 has been confirmed. This is a step arranged for the execution of retry processing. If it is determined that it is the first state confirmation, the process advances to step S802. If it is determined to be the second state confirmation that has been performed once again, the CPU will determine that an error has occurred, and the process will advance to step S809. Note that although the error processing is started in a case in which the main power switch 380 is not set to OFF even in the second retry processing operation, there is no problem in suitably setting the retry processing operation count.

In step S809, the CPU 201 determines that a power off error has occurred in the shutdown processing. Subsequently, the process advances to step S810, and the CPU 201 obtains the value of the power supply result from the register 390 of the power supply control unit 214. If the value of the register 390 is "1", it indicates that the power supply to the solenoid 404 has been performed correctly. If the value is "0", it can be considered that an abnormality has occurred in the switch 311 because the solenoid 404 has not been energized.

Hence, in step S811, the CPU 201 determines whether the value of the register 390 obtained in step S810 is "0" or "1". If the value is "1", the process advances to step S812. If the value is "0", the process advances to step S814. In step S812, the CPU 201 determines that the main power switch 380 is defective because the power was not set to OFF even though the solenoid 404 was energized. Subsequently, the process advances to step S813, and the CPU 201 causes the console unit 12 to display an error message indicating that the power could not be set to OFF by a component defect of the main power switch 380.

Figure 9A:
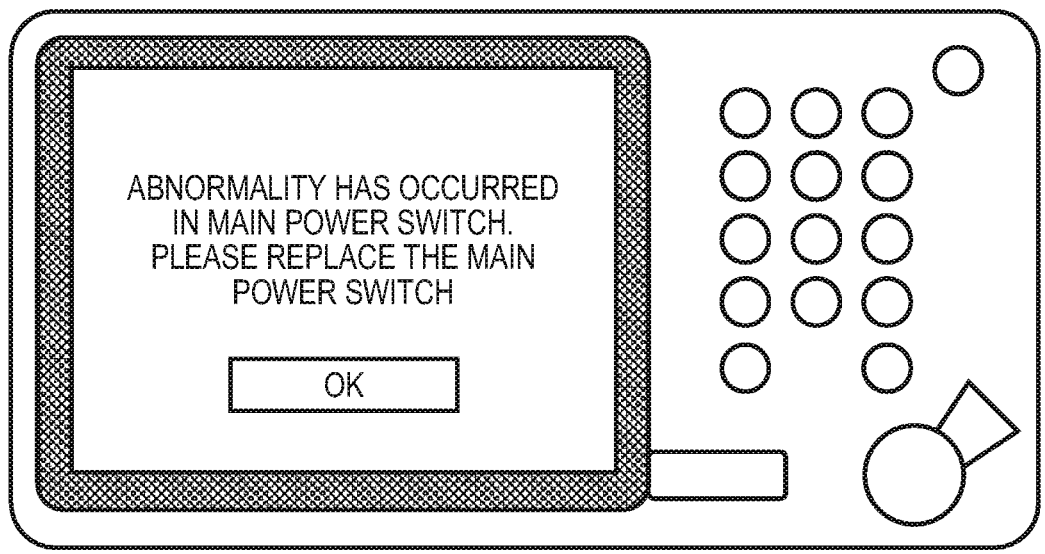
FIGS. 9A and 9B depict views each showing an example of error display which is displayed on a console unit in step S813 or step S815 of FIG. 8.
Figure 9B:
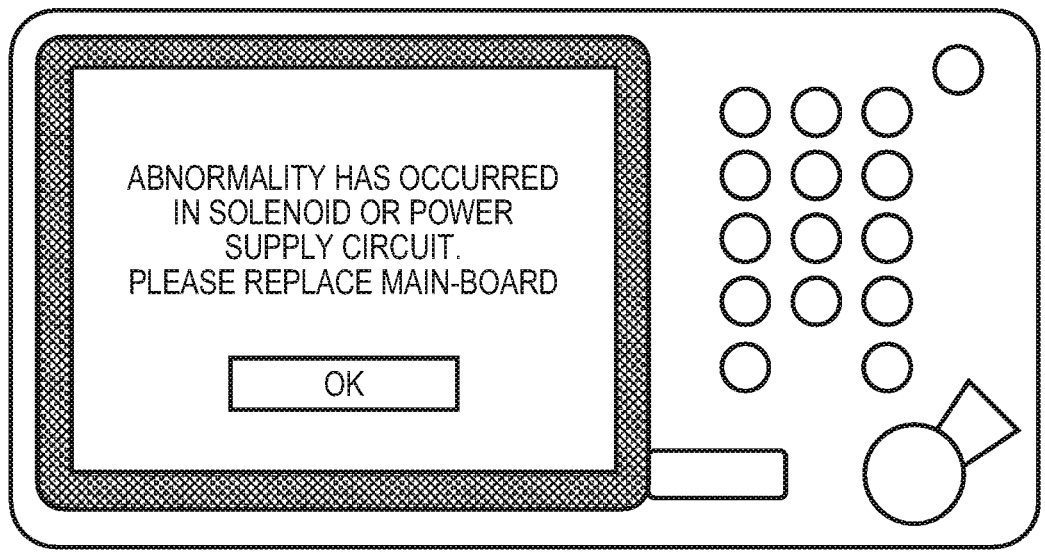

FIGS. 9A and 9B depict views each showing an example of an error message to be displayed on the console unit 12 in step S813 or step S815 of FIG. 8.

In step S813, for example, a message indicating that the main power switch is defective will be displayed on the console unit 12 as shown in FIG. 9A. Alternatively, it is possible to consider a plurality of methods such as a method of using an LED or the like included in the image forming apparatus 10 to indicate the occurrence of an error, a method of causing the PC 40 (the remote UI or the like displayed on the display of the PC 40) which transmitted the shutdown instruction to display a message, and the like.

On the other hand, in step S814, the CPU 201 will determine that the switch 311 is defective since the solenoid 404 cannot be energized. Subsequently, the process advances to step S815, and the CPU 201 displays an error message indicating that the power cannot be set to OFF due to a defect in the power supply to the solenoid 404. For example, a message such as that shown in FIG. 9B can be displayed here in this case. Note that in step S815, since the defect may be a defect of the solenoid 404, the fact of this possibility is also mentioned in the message in FIG. 9B. In this manner, the CPU 201 in steps S813 and S815 corresponds to a notification unit that performs notification corresponding to the energization state of the solenoid 404.

As described above, according to the embodiment, in a case in which the power switch off control of by the mechanical relay has failed, it is possible to accurately grasp the location of the breakdown and present the breakdown location to the user.

Note that although various kinds of components such as the CPU 201, the RAM 202, and the like are arranged in the control unit 11 in this embodiment, it may be arranged so that these components are mounted individually on the substrate or arranged so that a plurality of the components will be integrated as an IC component. Also, although the CPU 201 executed processes of step S802 and subsequent steps by determining whether or not a shutdown instruction has been received by remote control in step S801, this process may be arranged as follows. That is, in step S801, the CPU 201 may determine whether or not the current time has arrived at the shutdown time set in the image forming apparatus 10 and perform the processes of step S802 and subsequent steps when the current time has arrived at the shutdown time. That is, the arrival of the current time at the shutdown time set in advance in the image forming apparatus 10 may be included as a predetermined condition for automatically setting the main power switch 380 to OFF.

OTHER EMBODIMENTS

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-180942, filed Sep. 26, 2018, which is hereby incorporated by reference herein in its entirety.

What is claimed is:

1. An electronic device comprising:
a power switch to turn the electronic device ON or OFF;
a solenoid that drives the power switch to an ON state or to an OFF state by applying a pressure to a mechanical switch of the power switch;
a power supply unit that supplies power to the solenoid via a power supply line;
a detection module that detects whether or not the power is supplied to the solenoid through the power supply line; and
one or more controllers configured to:
determine whether or not the power switch is turned to the ON state or to the OFF state based on a signal from the power switch;
determine that the power switch is defective in a case where the detection module detects that the power is supplied to the solenoid and it is determined that the power switch is not turned to the OFF state; and
determine that a power supply failure to the solenoid occurs in a case where the detection module detects that the power is not supplied to the solenoid and it is determined that the power switch is not turned to the OFF state.

2. The device according to claim 1, further comprising a switch connected between the solenoid and the power supply unit, and the switch is switched to an ON state or an OFF state in accordance with a control signal from the one or more controllers.

3. The device according to claim 1, wherein the one or more controllers include a memory that stores information indicating a state of the power supply to the solenoid.

4. The device according to claim 3, wherein after the power supply to the solenoid, the one or more controllers store the information indicating the state of the power supply to the solenoid.

5. The device according to claim 1, wherein an instruction for causing the one or more controllers to control the power supply to the solenoid is issued in accordance with having written data in a register of the one or more controllers.

6. The device according to claim 5, wherein the instruction is issued in response to a shutdown instruction by remote control.

7. The device according to claim 1, wherein if a number of times in which the one or more controllers has determined that the power switch is not switched to the OFF state in accordance with the control signal from the one or more controllers has reached a predetermined number, the one or more controllers present, to a user, the error factor that prevents the power switch from switching to the OFF state.

8. The device according to claim 1, further comprising:
a display that displays information,
wherein the one or more controllers notify the error factor using the display.

9. The device according to claim 1, wherein the power switch is configured to accept a user operation and comprises a power switch that includes a mechanical relay.

* * * * *